United States Patent
Duan

(10) Patent No.: US 11,760,337 B2
(45) Date of Patent: Sep. 19, 2023

(54) POWER DRIVE SYSTEM FOR HYBRID POWER VEHICLE

(71) Applicants: Beijing National New Energy Vehicle Technology Innovation Center Co., Ltd., Beijing (CN); Zhihui Duan, Beijing (CN)

(72) Inventor: Zhihui Duan, Beijing (CN)

(73) Assignees: Beijing National New Energy Vehicle Technology Innovation Center Co., Ltd., Beijing (CN); Zhihui Duan, Beijing (CN)

( * ) Notice: Subject to any disclaimer, the term of this patent is extended or adjusted under 35 U.S.C. 154(b) by 0 days.

(21) Appl. No.: 17/761,666

(22) PCT Filed: Sep. 16, 2020

(86) PCT No.: PCT/CN2020/115648
§ 371 (c)(1),
(2) Date: Mar. 18, 2022

(87) PCT Pub. No.: WO2021/052372
PCT Pub. Date: Mar. 25, 2021

(65) Prior Publication Data
US 2022/0340121 A1  Oct. 27, 2022

(30) Foreign Application Priority Data
Sep. 20, 2019 (CN) .......................... 201910893191.1

(51) Int. Cl.
*B60K 6/365* (2007.10)
*B60W 20/30* (2016.01)
(Continued)

(52) U.S. Cl.
CPC ............ *B60W 20/30* (2013.01); *B60W 10/02* (2013.01); *B60W 10/06* (2013.01); *B60W 10/08* (2013.01);
(Continued)

(58) Field of Classification Search
CPC . B60K 6/48; B60K 6/365; B60K 6/36; B60K 6/547; B60K 6/54;
(Continued)

(56) References Cited

U.S. PATENT DOCUMENTS 8,579,751 B2 * 11/2013 Phillips ................. B60W 10/08
475/221
8,931,371 B2  1/2015 Xie et al.
(Continued)

FOREIGN PATENT DOCUMENTS

CN   102059937 A   5/2011
CN   102310756 A   1/2012
(Continued)

OTHER PUBLICATIONS

English translation of CN106864247A; http://translationportal.epo.org; Mar. 16, 2023 (Year: 2023).*
(Continued)

*Primary Examiner* — Roger L Pang

(57) ABSTRACT

Provided is a power drive system for a hybrid power vehicle, including an engine, a hybrid power module, and a dual input shaft speed change mechanism, wherein the hybrid power module consists of a motor, a composite planetary gear mechanism, a clutch, and a brake; the composite planetary gear mechanism is provided with at least four rotating shafts which are respectively connected to a rotor of the motor, a power output shaft of the engine, and a first input shaft and a second input shaft of the dual input shaft speed change mechanism; the brake is disposed on the
(Continued)

power output shaft of the engine; and the clutch is disposed between any two of the four rotating shafts of the composite planetary gear mechanism.

7 Claims, 5 Drawing Sheets

(51) Int. Cl.
*B60W 10/02* (2006.01)
*B60W 10/06* (2006.01)
*B60W 10/08* (2006.01)
*B60W 10/113* (2012.01)
*B60W 30/19* (2012.01)
*F16H 3/58* (2006.01)
*F16H 3/12* (2006.01)
*F16H 3/72* (2006.01)
*F16H 3/66* (2006.01)
*F16H 37/06* (2006.01)

(52) U.S. Cl.
CPC .......... *B60W 10/113* (2013.01); *B60W 30/19* (2013.01); *B60W 2510/0638* (2013.01); *B60W 2510/081* (2013.01); *B60W 2710/0666* (2013.01); *B60W 2710/081* (2013.01); *B60W 2710/083* (2013.01); *B60W 2710/1011* (2013.01); *B60W 2710/1022* (2013.01); *F16H 3/126* (2013.01); *F16H 3/58* (2013.01); *F16H 3/663* (2013.01); *F16H 3/72* (2013.01); *F16H 37/065* (2013.01)

(58) Field of Classification Search
CPC ....... B60K 2006/4816; F16H 2003/123; F16H 3/126; F16H 3/58; F16H 3/72; F16H 3/663; F16H 30/006; F16H 37/065; F16H 2037/047; F16H 2037/048; B60W 20/30; B60W 10/02; B60W 10/06; B60W 10/08; B60W 10/113; B60W 30/19; B60W 2510/081; B60W 2710/0666; B60W 2710/083; B60W 2710/1011; B60W 2710/1022; B60W 10/115
USPC .................................................. 475/5; 74/330
See application file for complete search history.

(56) References Cited

U.S. PATENT DOCUMENTS

| | | | |
|---|---|---|---|
| 9,308,907 | B2 | 4/2016 | Moon et al. |
| 9,770,969 | B2* | 9/2017 | Björkman .............. B60K 6/445 |
| 10,569,635 | B2* | 2/2020 | Duan ...................... F16H 3/087 |
| 2007/0087893 | A1 | 4/2007 | Tabata et al. |
| 2007/0099738 | A1* | 5/2007 | Holmes ................. B60W 10/02 |
| | | | 475/5 |
| 2016/0052381 | A1* | 2/2016 | Kaltenbach ........... B60W 20/40 |
| | | | 180/65.23 |

FOREIGN PATENT DOCUMENTS

| | | |
|---|---|---|
| CN | 103204056 A | 7/2013 |
| CN | 106864247 A | 6/2017 |
| CN | 106976389 A | 7/2017 |
| CN | 110509760 A | 11/2019 |
| DE | 19909424 A1 | 8/2000 |

OTHER PUBLICATIONS

International Search Report of PCT Patent Application No. PCT/CN2020/115648 dated Dec. 16, 2020.

* cited by examiner ness mechanism. The mechanical gearbox has the following functions: reducing speed, improving torque, changing a speed ratio between an input shaft and an output shaft, such that the engine and the motor can operate efficiently, thereby improving the torque and the wheel torque. A dual clutch transmission (DCT) is often used as a mechanical transmission mechanism.

POWER DRIVE SYSTEM FOR HYBRID POWER VEHICLE

TECHNICAL FIELD

The present invention relates to the technical field of hybrid power vehicles, and more particularly to a power drive system for a hybrid power vehicle.

BACKGROUND ART

Hybrid power automobile is a power system having the best industrialization and market prospect in electric automobiles. The hybrid power automobile uses a heat engine and a motor as power sources, and can be driven by the engine, or the electric power, or the hybrid power, thereby reducing fuel consumption. The hybrid power automobile can also replace some fuel or gas with the electric power, thereby partially changing the energy structure.

A single-motor parallel hybrid power system is a hybrid power system which is widely used in the hybrid power automobile, and consists of an engine, a motor, a power coupling mechanism, and mechanical gearbox, wherein the motor has multiple functions, such as separately driving the vehicle, assisting the engine to drive the vehicle, generating power during driving and parking, energy regenerative braking and the like. The power coupling mechanism has the following function: opening or closing power output channels of the engine and the motor or switching a flow direction thereof as required or according to an institution, so as to realize various operating conditions of the hybrid power automobile. The mechanical gearbox has the following functions: reducing speed, improving torque, changing a speed ratio between an input shaft and an output shaft, such that the engine and the motor can operate efficiently, thereby improving the torque and the wheel torque. A dual clutch transmission (DCT) is often used as a mechanical transmission mechanism.

U.S. Pat. No. 8,931,371 discloses a hybrid power system, using the DCT as a mechanical transmission apparatus; an output shaft of an engine is connected to one ends of two first clutches; the other ends of the first clutches are respectively connected to a first input shaft and a second input shaft; and a drive motor is directly connected to an output shaft of a gearbox. In a pure electric power driving mode, the first clutches are disengaged; the engine is separated from a wheel; and the motor directly drives the wheel. In a hybrid driving mode, the DCT gearbox operates like a conventional gearbox; the motor can assist to drive, generate power or idle as required, thereby being simple and practical, and having a high transmission efficiency. However, the hybrid power system has the following disadvantages: 1. The drive motor and the wheel are connected and cannot be separated; therefore, the drive motor cannot generate power during parking, and a power generator is required to solve the parking power generation problem; furthermore, how to supply power to an air conditioner compressor is another problem to be solved; and 2. A speed ratio between the motor and the wheel is fixed; the motor has a high requirement for the output torque, has a wide rotational speed range and a high cost; and the average efficiency is affected.

U.S. Pat. No. 9,308,907 discloses a hybrid power system, also using the DCT as a transmission apparatus; two first clutches of the DCT are respectively connected to a first input shaft and a second input shaft; a drive motor is located between an output shaft of an engine and the two first clutches; and one first clutch is disengaged between a motor and a power output shaft of the engine. In the pure electric power driving mode, the first clutches are disengaged; the power output shaft of the engine is separated from a motor shaft; the engine stops operating; the motor rotates and outputs a torque, and drives a wheel by means of a gearbox to realize pure electric power drive. When the engine operates, the disengaged first clutches are engaged; the engine and the motor are locked; and the power outputted by the engine is transferred to the motor and an input shaft of the gearbox by means of the first clutches, so as to realize hybrid drive. The hybrid power system has a high transmission efficiency. The motor can be disengaged from the wheel, can generate power during parking, and can supply power to the air conditioner compressor during parking. The drive motor is located at an input end of the gearbox; a speed ratio between the drive motor and the wheel is variable; the motor has low requirements for torque and speed, and has a low cost and a high operating efficiency. However, the hybrid power system has two disadvantages: 1. The dual first clutch technology is complex and has a high cost; and especially the first clutches are difficult to control; and 2. The hybrid power system generally only has six or seven gear positions (the axial length will increase in case of more gear positions); speed ratios between the gear positions have a big difference, which is adverse to the optimization of an operating point of the engine and the reduction of fuel consumption.

BRIEF DESCRIPTION OF THE INVENTION

In order to solve the above problems, the objective of the present invention is to provide a power drive system for a hybrid power vehicle. The power drive system has a simple and reliable structure, a reasonable and compact design, and a high transmission efficiency, and can add a plurality of gears without increasing the number of transmission gear pairs.

To achieve the above object of the present invention, the present invention adopts the following technical solution:

A power drive system for a hybrid power vehicle, including an engine, a hybrid power module, and a dual input shaft speed change mechanism, wherein the hybrid power module consists of a motor, a composite planetary gear mechanism, a first clutch, and a brake; the composite planetary gear mechanism is provided with at least four rotating shafts which are respectively connected to a rotor of the motor, a power output shaft of the engine, and a first input shaft and a second input shaft of the dual input shaft speed change mechanism; a rotational speed of the power output shaft of the engine is between a rotational speed of the first input shaft and a rotational speed of the second input shaft, and the rotational speed of the first input shaft is between a rotational speed of the motor and a rotational speed of the engine; the brake is disposed on the power output shaft of the engine; the first clutch is disposed between any two of the four rotating shafts of the composite planetary gear mechanism; the dual input shaft speed change mechanism consists of the first input shaft, the second input shaft, multiple pairs of gears for forward gear positions, at least one set of gears for the reverse gear position, and at least one output shaft; driving gears of odd gear positions are disposed on the first input shaft; driving gears of even gear positions are disposed on the second input shaft; driven gears of the gear positions are arranged on the output shaft; the driving gear of each gear position is meshed with the corresponding driven gear thereof; and in each gear position, there is one gear connected to a shaft at which the gear is located by means of a synchronizer or other connectors.

Further, the composite planetary gear mechanism is a Ravigneaux planetary gear mechanism, and consists of a single planetary gear set and a double planetary gear set; the single planetary gear train consists of a large sun gear SL, a gear ring R, a planetary gear PL, and a planet carrier C; the large sun gear SL is meshed with the planetary gear PL; the planetary gear PL is meshed with the gear ring R; a rotating shaft of the planetary gear PL is arranged on the planet carrier C; the double planetary gear train includes a small sun gear SS and an inner planetary gear PS, and shares the gear ring R, the planet carrier C, and the planetary gear PL with the single planetary gear train; the small sun gear SS is meshed with the inner planetary gear PS; the inner planetary gear PS is meshed with the planetary gear PL; a rotating shaft of the inner planetary gear PS is fixed on the planet carrier C; a rotating shaft of the gear ring R is connected to the power output shaft of the engine, such that the power of the engine can act on the planetary gear mechanism by means of the gear ring R; a rotating shaft of the large sun gear SL is connected to the rotor of the motor; a rotating shaft of the planet carrier C is connected to the first input shaft of the dual input shaft speed change mechanism; and a rotating shaft of the small sun gear SS is connected to the second input shaft of the dual input shaft speed change mechanism.

Further, the brake in the hybrid power module can also be replaced with a second clutch; and the second clutch is mounted on the power output shaft of the engine.

In the power drive system for a hybrid power vehicle, when the synchronizer or the other connectors only engages/engage one gear position and the first clutch is engaged, the power output shaft of the engine outputs the gear position; and by engaging the synchronizer or the other connectors in different gear positions, the power output shaft of the engine can realize an inherent gear position of each gear.

In the power drive system for a hybrid power vehicle, when the first clutch is disengaged and the synchronizer or the other connectors engages/engage an odd gear position and an even gear position, the power output shaft of the engine outputs a derivative gear position between the odd gear position and the even gear position; and one derivative gear position is generated between each pair of adjacent odd and even gear positions.

The present invention provides a gearshift control method of the power drive system for a hybrid power vehicle. The method is realized under the control of a vehicle control unit, and includes the following steps:

gearshift has the following four situations: (1) a currently engaged odd gear position i is shifted to an adjacent derivative gear position i/i+1 or i/i−1; (2) a currently engaged derivative gear position i/i+1 or i/i−1 is shifted to an adjacent odd gear position i or an even gear position i+1; (3) a currently engaged even gear position j is shifted to an adjacent derivative gear position j/j+1 or j/j−1; and (4) a currently engaged derivative gear position j/j+ or j/j− is shifted to an adjacent odd gear position j+1 or j−1;

(1) An odd gear position i is shifted to a derivative gear position i/i+1 or i/i−1:

System state before the gearshift: the odd gear position i is engaged, the first clutch is engaged, the composite planetary gear mechanism is locked, and the engine and the motor parallelly drive the first input shaft 11; the gearshift steps are as follows:

Step 1, adjusting the torques of the engine and the motor to achieve balance with the torque of the first input shaft;

Step 2, disengaging the first clutch;

Step 3, regulating the speed of the motor to synchronize the second input shaft with the gear position i+1 or the gear position i−1;

Step 4, engaging the synchronizer or the other connectors in the even gear position i+1 or the even gear position i−1; and Step 5, adjusting the torques of the engine and the motor as required. After the gearshift, the system engages the derivative gear position i/i+1 or i/i−1, and the speed ratio of the engine is between the speed ratio for the gear position i and the speed ratio for the gear position i+1 or between the speed ratio for the gear position i and the speed ratio for the gear position i−1.

(2a) a derivative gear position i/i+1 is shifted to an even gear position i+1:

System state before the gearshift: the odd gear position i and the even gear position i+1 are engaged, the first clutch is disengaged, and the engine and the motor respectively drive the first input shaft and the second input shaft; the gearshift steps are as follows:

Step 1, adjusting the torques of the engine and the motor to achieve balance with the torque of the second input shaft, and adjusting the torque of the first input shaft to be zero;

Step 2, disengaging the odd gear position i;

Step 3, regulating the speed of the motor to synchronize the rotational speed of the motor and the rotational speed of the engine with the rotational speed of the second input shaft;

Step 4, engaging the first clutch, locking the composite planetary gear mechanism, and rotating the four rotating shafts at the same speed; and Step 5, adjusting the torques of the engine and the motor as required, so as to complete the gearshift of the even gear position i+1.

(2b) a derivative gear position i/i+1 is shifted to an odd gear position i:

System state before the gearshift: the odd gear position i and the even gear position i+1 are engaged, the first clutch is disengaged, and the engine and the motor respectively drive the first input shaft and the second input shaft; the gearshift steps are as follows:

Step 1, adjusting the torques of the engine and the motor to achieve balance with the torque of the first input shaft, and adjusting the torque of the second input shaft to be zero;

Step 2, disengaging the even gear position j;

Step 3, regulating the speed of the motor to synchronize the rotational speed of the motor and the rotational speed of the engine with the rotational speed of the first input shaft;

Step 4, engaging the first clutch, locking the composite planetary gear mechanism, and rotating the four rotating shafts at the same speed; and Step 5, adjusting the torques of the engine and the motor as required, so as to complete the gearshift of the odd gear position i.

(3) An even gear position j is shifted to a derivative gear position j/j+1 or j/j−1:

System state before the gearshift: the even gear position j is engaged, the first clutch is engaged, the composite planetary gear mechanism is locked, and the engine and the motor parallelly drive the second input shaft; the gearshift steps are as follows:

Step 1, adjusting the torques of the engine and the motor to achieve balance with the torque of the second input shaft;

Step 2, disengaging the first clutch, and enabling the composite planetary gear mechanism to differentially rotate;

Step 3, regulating the speed of the motor to synchronize the first input shaft with the odd gear position j+1 or the odd gear position j−1;

Step 4, engaging the synchronizer or the other connectors in the gear position j+1 or the gear position j−1; and Step 5, adjusting the torques of the engine and the motor as required. The system completes the gearshift of the derivative gear position j/j+1 or j/j−1, and the speed ratio of the engine is between the speed ratio for the gear position j and the speed ratio for the gear position j+1 or between the speed ratio for the gear position j and the speed ratio for the gear position j−1.

(4a) a derivative gear position j/j+1 is shifted to an odd gear position j+1:

System state before the gearshift: the even gear position j and the odd gear position j+1 are engaged, the first clutch is disengaged, and the engine and the motor respectively drive the first input shaft and the second input shaft; the gearshift steps are as follows:

Step 1, adjusting the torques of the engine and the motor to achieve balance with the torque of the first input shaft, and adjusting the torque of the second input shaft to be zero;

Step 2, disengaging the even gear position j;

Step 3, regulating the speed of the motor to synchronize the rotational speed of the motor and the rotational speed of the engine with the rotational speed of the first input shaft;

Step 4, engaging the first clutch, locking the composite planetary gear mechanism, and rotating the four rotating shafts at the same speed; and Step 5, adjusting the torques of the engine and the motor as required, so as to complete the gearshift of the odd gear position j+1.

(4b) a derivative gear position j/j−1 is shifted to an odd gear position j−1:

System state before the gearshift: the even gear position j and the odd gear position j+1 are engaged, the first clutch is disengaged, and the engine and the motor respectively drive the first input shaft and the second input shaft; the gearshift steps are as follows:

Step 1, adjusting the torques of the engine and the motor to achieve balance with the torque of the second input shaft, and adjusting the torque of the first input shaft to be zero;

Step 2, disengaging the odd gear position j+1;

Step 3, regulating the speed of the motor to synchronize the rotational speed of the motor and the rotational speed of the engine with the rotational speed of the second input shaft;

Step 4, engaging the first clutch, locking the composite planetary gear mechanism, and rotating the four rotating shafts at the same speed; and Step 5, adjusting the torques of the engine and the motor as required, so as to complete the gearshift of the odd gear position j−1.

The present invention further sets forth a vehicle including the power drive system.

With the above technical solution, the present invention has the following advantages:

The power drive system for a hybrid power vehicle utilizes a differential characteristic of the composite planetary gear mechanism and a double-input-shaft characteristic of the dual input shaft speed change mechanism, and adds a plurality of derivative speed ratios/transmission gears on the basis of the original gear positions of the dual input shaft speed change mechanism, such that the operating rotational speed of the engine is closer to an optimum operating point, thereby broadening the speed ratio change range, and improving the efficiency of the engine. During gearshift, the motor respectively drives the first input shaft and the second input shaft of the transmission mechanism to precisely regulate speed; and after the input shafts are synchronized with a gear position to be engaged, the synchronizer directly engages the gear position, thereby improving the gearshift smoothness. Furthermore, the power drive system avoids using two clutches having a starting function, thereby reducing the use of high cost components, and reducing the power system cost. The hybrid power gearbox realizes gear transmission, thereby having a high transmission efficiency. The power drive system realizes the functions of pure electric power driving, engine and motor hybrid driving, energy regenerative braking, cruise power generation, parking power generation and the like.

In the figures: 1, engine; 2, power output shaft; 3, brake; 4, first clutch; 5, composite planetary gear mechanism; 6, motor; 7, rotor; 8, second clutch; 11, first input shaft; 12, second input shaft; 10, hybrid power module; 15, output shaft; 20, dual input shaft speed change mechanism; SL, large sun gear; PL, planetary gear; R, gear ring; C, planet carrier; SS, small sun gear; PS, inner planetary gear; G (1-6), gears for forward gear positions; GR, gear for the reverse gear position; S (1-6), synchronizer; and SR, reverse gear synchronizer.

DETAILED DESCRIPTION OF THE EMBODIMENTS

The technical solution of the present invention will be further described in detail hereafter with reference to the accompanying drawings and embodiments.

Figure 1:
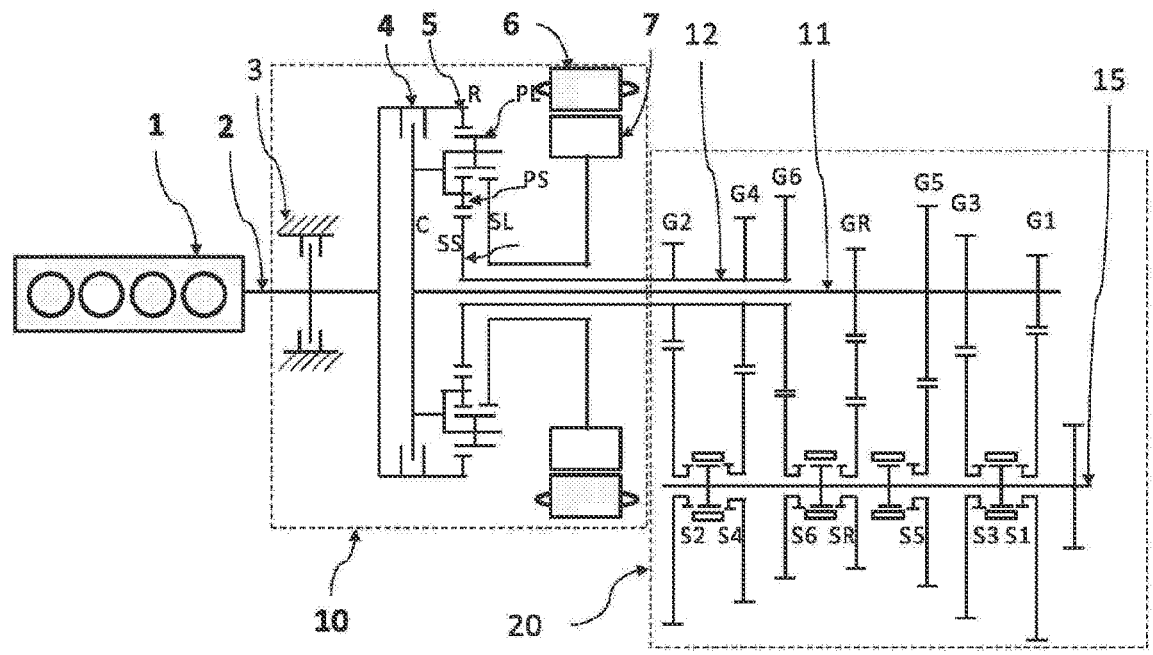
FIG. 1 is a structural schematic view of a power drive system for a hybrid power vehicle according to a first embodiment of the present invention.
Figure 3:
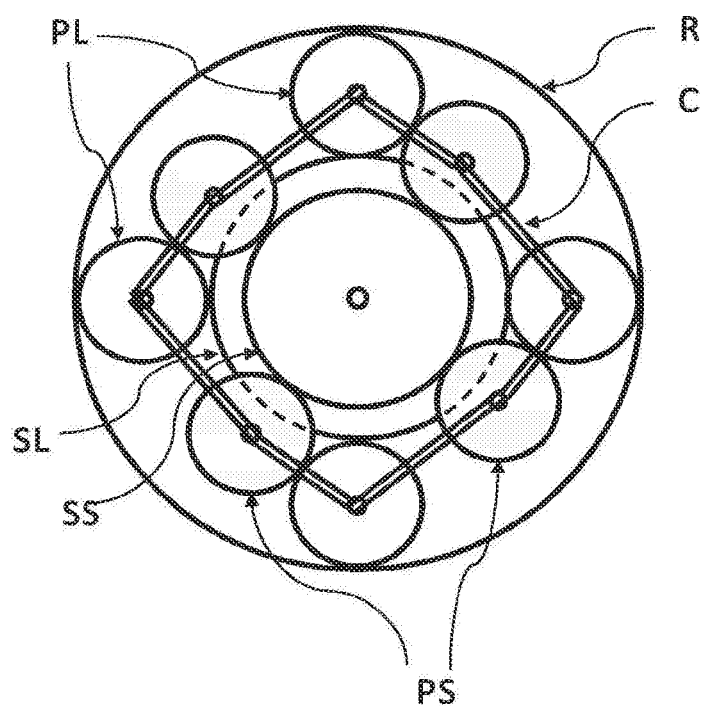
FIG. 3 is a structural schematic view of a Ravigneaux planetary gear mechanism as shown in FIG. 1.
Figure 4:
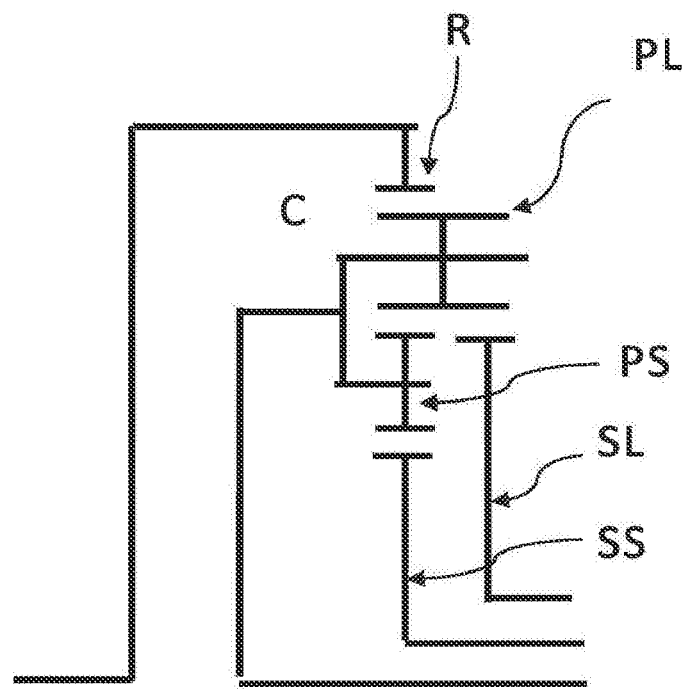
FIG. 4 is a structural schematic view of the Ravigneaux planetary gear mechanism as shown in FIG. 2.

As shown in FIGS. 1, 3, and 4, a power drive system for a hybrid power vehicle includes an engine 1, a hybrid power module 10, and a dual input shaft speed change mechanism 20, wherein the hybrid power module 10 consists of a motor 6, a composite planetary gear mechanism 5, a first clutch 4, and a brake 3. The composite planetary gear mechanism 5 is a Ravigneaux planetary gear mechanism, and consists of a single planetary gear train and a double planetary gear train; the single planetary gear train consists of a large sun gear SL, a gear ring R, a planetary gear PL, and a planet carrier C; the large sun gear SL is meshed with the planetary gear PL; the planetary gear PL is meshed with the gear ring R; a rotating shaft of the planetary gear PL is arranged on the planet carrier C; the double planetary gear train includes a small sun gear SS and an inner planetary gear PS, and shares the gear ring R, the planet carrier C, and the planetary gear PL with the single planetary gear train; the small sun gear SS is meshed with the inner planetary gear PS; the inner planetary gear PS is meshed with the planetary gear PL; a rotating shaft of the inner planetary gear PS is fixed on the planet carrier C. The Ravigneaux planetary gear mechanism includes at least four rotating shafts which are respectively a rotating shaft of the gear ring R, a rotating shaft of the large sun gear SL, a rotating shaft of the planet carrier C, and a rotating shaft of the small sun gear SS. The axial lines of the four rotating shafts are on the same straight line. A rotating shaft of the gear ring R is connected to a power output shaft 2 of the engine 1, such that the power of the engine can act on the planetary gear mechanism by means of the gear ring R; a rotating shaft of the large sun gear SL is connected to a rotor 7 of the motor 6; a rotating shaft of the planet carrier C is connected to a first input shaft 11 of the dual input shaft speed change mechanism 20; and a rotating shaft of the small sun gear SS is connected to a second input shaft 12 of the dual input shaft speed change mechanism 20. A rotational speed of the power output shaft 2 of the engine is between a rotational speed of the first input shaft 11 and a rotational speed of the second input shaft 12, and the rotational speed of the first input shaft 11 is between a rotational speed of the motor 6 and a rotational speed of the engine 1. The brake 3 is disposed on the power output shaft 2 of the engine. The first clutch 4 is disposed between any two of the four rotating shafts of the composite planetary gear mechanism, and is used to lock the four rotating shafts of the composite planetary gear mechanism together, and rotate the four rotating shafts at the same speed. The dual input shaft speed change mechanism 20 consists of the first input shaft 11, the second input shaft 12, multiple pairs of gears for forward gear positions, at least one set of gears GR for the reverse gear position, and at least one output shaft 15; the multiple pairs of gears for forward gear positions are respectively gear positions G1, G2, G3, . . . ; a steering gear is disposed between two gears in the one set of gears GR for the reverse gear position; driving gears of odd gear positions are disposed on the first input shaft; driving gears of even gear positions are disposed on the second input shaft; driven gears of the gear positions are arranged on the output shaft;

the driving gear of each gear position is meshed with the corresponding driven gear thereof. In each pair of gears, one gear is connected to a shaft at which the gear is located by means of a synchronizer. When the synchronizer engages a gear position, the gear and the corresponding shaft are connected and rotate at the same speed; and when the synchronizer disengages the gear position, the gear and the corresponding shaft are disconnected and can rotate at different speeds.

Figure 2:
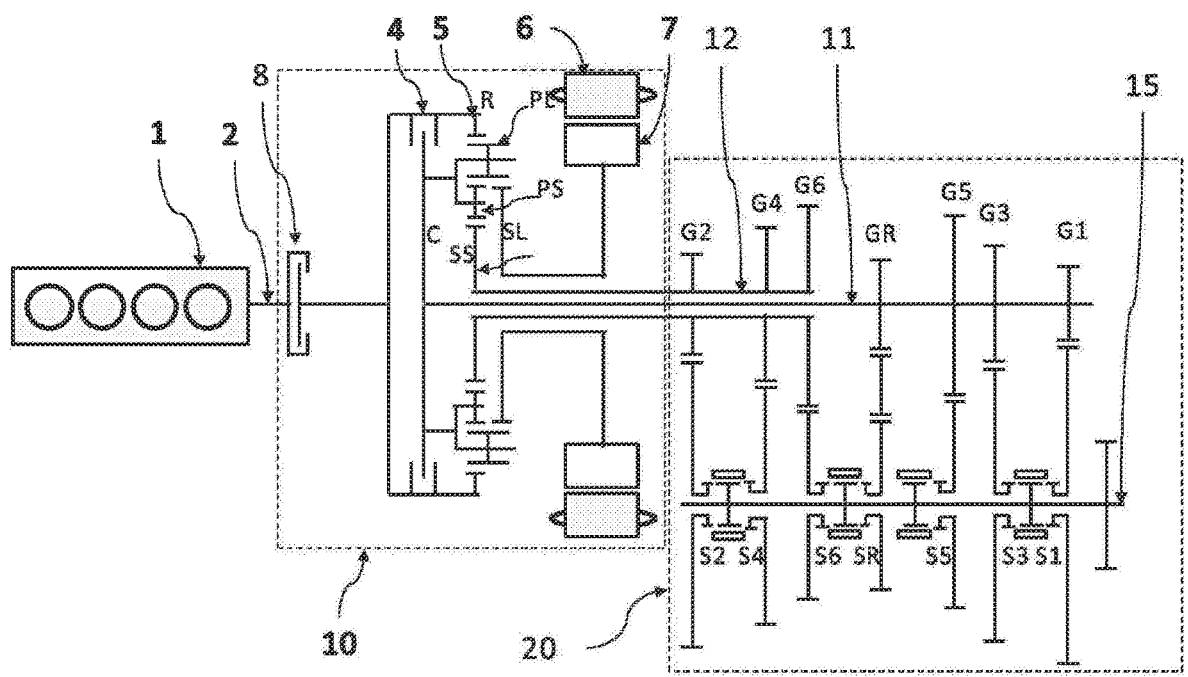
FIG. 2 is a structural schematic view of the power drive system for a hybrid power vehicle according to a second embodiment of the present invention.

The brake 3 in the hybrid power module 20 can also be replaced with a second clutch 8; as shown in FIG. 2, the second clutch 8 is mounted on the power output shaft 2 of the engine, and the other structures remain unchanged. In the pure electric power driving mode, the second clutch 8 is disengaged, so as to separate the power output shaft 2 of the engine from the hybrid power module 20; an odd gear position is engaged; the first clutch 4 is engaged; the planetary gear trains are locked together, and rotate at the same speed; the motor outputs a torque, and drives the wheel by means of the planetary gear trains and an engaging gear. In the engine and motor hybrid driving mode, the second clutch 8 is engaged; the power output shaft 2 of the engine is connected to a relevant rotating shaft in the planetary gear train; and all the other functions and the implementation method remain unchanged.

The Ravigneaux planetary gear mechanism comprises four shafts rotating around a fixed axis: a rotating shaft of the large sun gear SL, a rotating shaft of the small sun gear SS, a rotating shaft of the planet carrier C, and a rotating shaft of the gear ring R. The four rotating shafts have a certain kinematic constraint therebetween: the rotational speeds of the large sun gear SL, the planet carrier C, and the gear ring R have a kinematic constraint for the single planetary gear train therebetween:

$$n_R + \rho_1 \cdot n_{SL} = (1+\rho_1) \cdot n_C \qquad (1)$$

Furthermore, the rotational speeds of the small sun gear SS, the planet carrier C, and the gear ring R have a kinematic constraint for the double planetary gear train therebetween:

$$n_R - \rho_2 \cdot n_{SS} = (1-\rho_1) \cdot n_C \qquad (2)$$

Wherein $n_R$, $n_{SL}$, $n_C$, and $n_{SS}$ respectively denote the rotational speed of the gear ring R, the large sun gear SL, the planet carrier C, and the small sun gear SS; R, SL, and SS respectively denote the gears of the gear ring R, the large sun gear SL, and the small sun gear SS; $\rho_1$=SL/R, $\rho_2$=SS/R. R denotes the gear ring, and also denotes the teeth number of the gear ring; SL denotes the large sun gear, and also denotes the teeth number of the large sun gear; and SS denotes the small sun gear, and also denotes the teeth number of the small sun gear.

Figure 5:
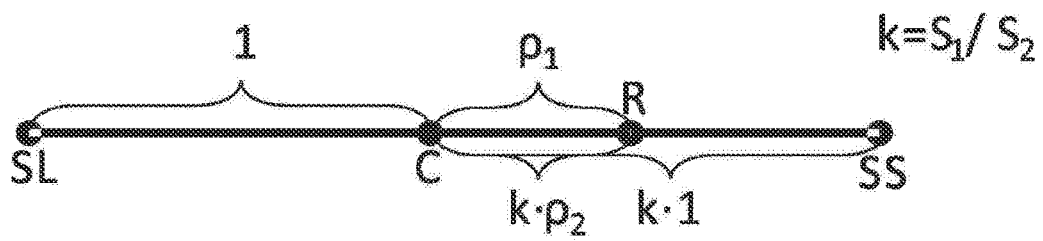
FIG. 5 is an equivalent lever representation view of the rotational speeds of four rotating shafts in the Ravigneaux planetary gear mechanism.
Figure 6:
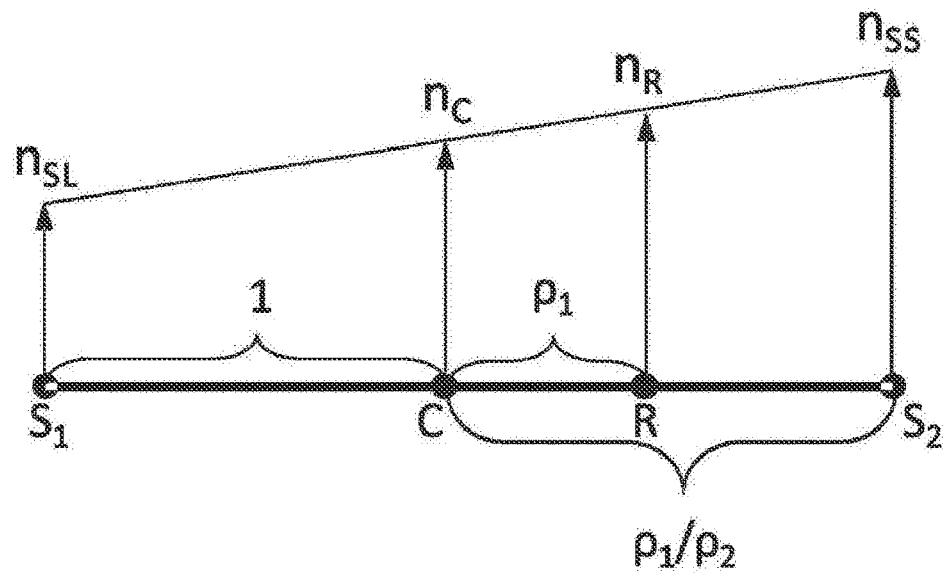
FIG. 6 is a lever representation view of the rotational speeds of the four rotating shafts in the Ravigneaux planetary gear mechanism.

The kinematic constraint between the four rotating shafts can also be intuitively described by using a lever view: a lever is horizontally placed, and is sequentially provided with four points thereon: SL, C, R, and SS which respectively represent the large sun gear SL, the planet carrier C, the gear ring R, and the small sun gear SS. The distance from the point SL to the point C is 1; the distance from the point C to the point R is $\rho_1$=SL/R; and the distance from the point C to the point SS is $\rho_1/\rho_2$, as shown in FIG. 5. A vector perpendicular to the lever is drawn from each point; and the lengths of the vectors respectively represent the rotational speeds of large sun gear SL, the planet carrier C, the gear ring R, and the small sun gear SS. The kinematic constraint between the four rotating shafts can be expressed as: the vertexes of the four vectors remain on the same straight line, as shown in FIG. 6.

It can be seen from the lever view that the rotational speeds of the four rotating shafts are always in order, namely $n_{SL} > n_C > n_R > n_{SS}$ or $n_{SL} < n_C < n_R < n_{SS}$ or $n_{SL} = n_C = n_R = n_{SS}$. The order $n_{SL}$, $n_C$, $n_R$, and $n_{SS}$ can be a descending order or an ascending order. However, the relative sequence does not change. Therefore, the rotational speed sequence of the four shafts is SL, C, R, and SS. The rotational speed sequence can also be described as: the rotational speed of the planet carrier is between the rotational speed of the large sun gear and the rotational speed of the gear ring, and the rotational speed of the gear ring is between the rotational speed of the planet carrier and the rotational speed of the small sun gear.

Figure 7:
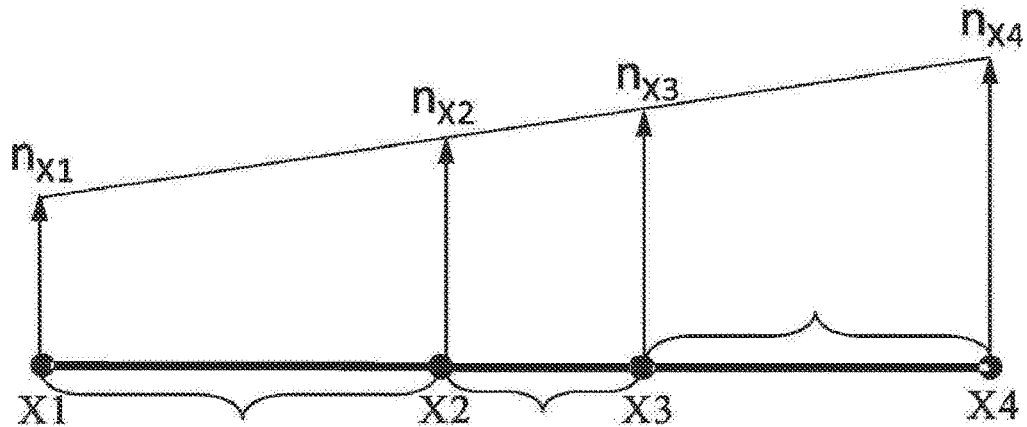
FIG. 7 is a lever representation view of the rotational speeds of the four rotating shafts in a composite planetary gear mechanism.

As shown in FIG. 7, in the power drive system for a hybrid power vehicle of the present invention, the composite planetary gear mechanism is formed by connecting at least two planetary gear trains in a certain manner; at least four rotating shafts rotate around the fixed axis; the four rotating shafts are respectively X1, X2, X3, and X4; the rotational speeds are respectively $n_{X1}$, $n_{X2}$, $n_{X3}$, and $n_{X4}$; the rotational speeds of the four rotating shafts have a certain kinematic constraint therebetween; the kinematic constraint can be expressed by a lever view: a lever is horizontally placed, and is sequentially provided with four points thereon: X1, X2, X3, and X4 which respectively represent the rotating shafts X1, X2, X3, and X4; the distances between the points are determined by a parameter of the planetary gear train. A vector perpendicular to the lever is drawn from each point; and the lengths of the vectors respectively represent the rotational speeds of the rotating shafts X1, X2, X3, and X4. The kinematic constraint between the four rotating shafts can be expressed as: the vertexes of the four vectors remain on the same straight line. It can be seen from the lever view that the rotational speeds of the four rotating shafts are $n_{X1} < n_{X2} < n_{X3} < n_{X4}$ or $n_{X1} > n_{X2} > n_{X3} > n_{X4}$ or $n_{X1} = n_{X2} = n_{X3} = n_{X4}$, that is, the rotational speeds of the four rotating shafts are in order; the order $n_{X1}$, $n_{X2}$, $n_{X3}$, and $n_{X4}$ can be a descending order or an ascending order. However, the relative sequence does not change. Therefore, the rotational speed sequence of the four shafts is X1, X2, X3, and X4. The rotational speed sequence can also be described as: the rotational speed of the shaft X2 is between the rotational speed of the shaft X1 and the rotational speed of the shaft X3, and the rotational speed of the shaft X3 is between the rotational speed of the shaft X2 and the rotational speed of the shaft X4. The rotating shaft X1 is connected to the rotor of the motor; the rotating shaft X2 is connected to the first input shaft; the rotating shaft X3 is connected to the power output shaft of the engine; and the rotating shaft X4 is connected to the second input shaft.

The Ravigneaux planetary mechanism is a special case of the composite planetary mechanism, wherein X1 is the large sun gear SL, X2 is the planet carrier C, X3 is the gear ring R, and X4 is the small sun gear SS. The distance from the point SL to the point C is 1; the distance from the point C to the point R is $\rho_1 = SL/R$; and the distance from the point C to the point SS is $\rho_1/\rho_2$.

Figure 8:
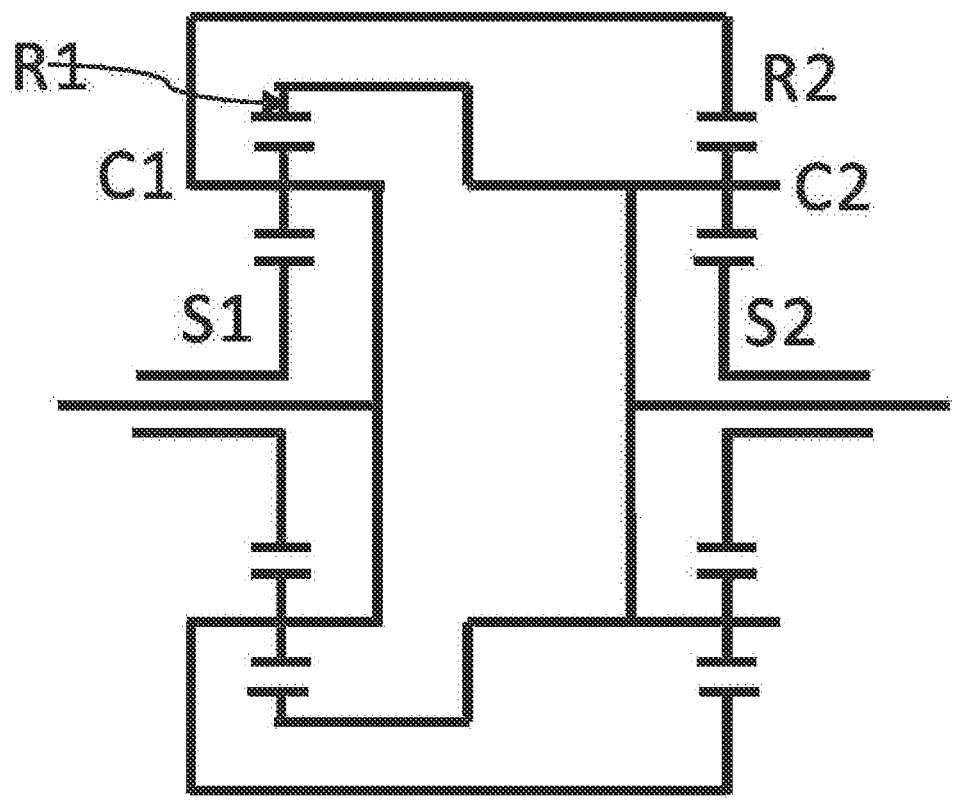
FIG. 8 is a structural schematic view of a C-R composite planetary gear mechanism.
Figure 9:
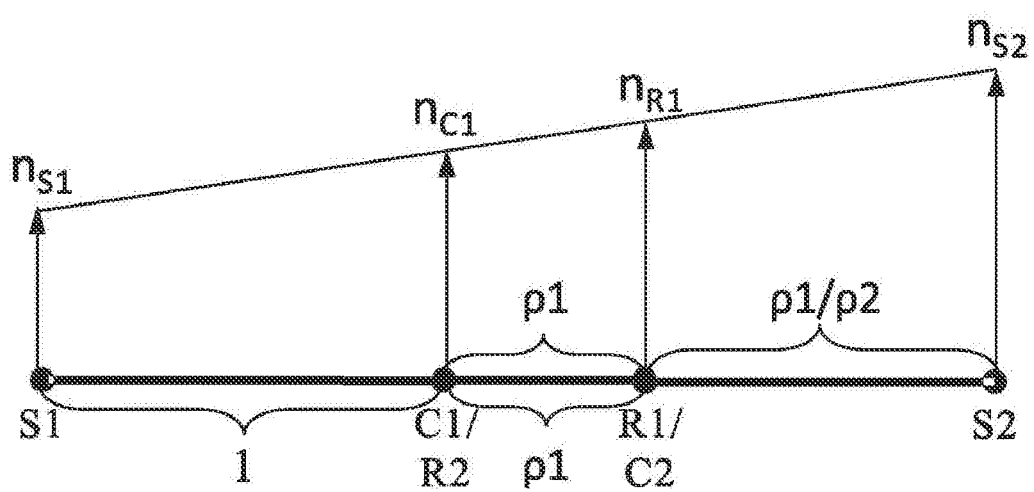
FIG. 9 is a lever representation view of the rotational speeds of the four rotating shafts in the C-R composite planetary gear mechanism as shown in FIG. 8.

The C-R composite planetary gear mechanism is also a special case of the composite planetary gear mechanism, and consists of two single planetary gear trains, wherein the gear ring and the planet carrier of one planetary gear train are respectively connected to the planet carrier and the gear ring of the other planetary gear train. The rotating shafts are totally four: the rotating shaft of the sun gear S1, the rotating shaft of the planet carrier C1/the gear ring R2, the rotating shaft of the gear ring R1/the planet carrier C2, and the rotating shaft of the sun gear S2, as shown in FIG. 8. The rotational speeds of the four rotating shafts can be represented by a lever view: a lever is horizontally placed, and is sequentially provided with four points thereon: C1/R2, R1/C2, and S2 which respectively represent the four rotating shafts of the composite planetary gear train. The distances between the points are determined by a parameter (for example, the teeth number of the sun gear and the gear ring) of the planetary gear train, and are marked on the figure, wherein $\rho_1 = S1/R1$, $\rho_2 = S2/R2$. A vector perpendicular to the lever is drawn from each point; the length of the vector represents the rotational speed of the rotating shaft; the upward vector represents forward rotation. The vertexes of the four vectors remain on the same straight line, as shown in FIG. 9. It can be seen from the view that the rotational speeds of the four rotating shafts are in order, and have the following relationship: $n_{S1} < n_{C1} < n_{R1} < n_{S2}$ or $n_{S1} > n_{C1} > n_{R1} > n_{S2}$ or $n_{S1} = n_{C1} = n_{R1} = n_{S2}$; the order can be an ascending order or a descending order. However, the relative sequence does not change. Therefore, the rotational speed sequence of the four rotating shafts is S1, C1, R1, and S2.

In the present invention, the rotating shaft X1 is connected to the rotor 7 of the motor 6, and applies a driving torque Tm; the rotating shaft X3 is connected to the power output shaft 2 of the engine 1, and applies a driving torque Ten; the rotating shaft X2 is connected to the first input shaft 11 of the dual input shaft speed change mechanism 20, and applies a reaction torque T1; and the rotating shaft X4 is connected to the second input shaft 12 of the dual input shaft speed change mechanism 20, and applies a reaction torque T2.

Under the situation that an odd gear position is engaged, if the product of the torque Tm and the distance from the point X1 to the point X2 is equal to the product of the torque Ten and the distance from the point X3 to the point X2, and the torques are in the same direction, then the torques of the motor and the engine relative to rotating shaft X2 achieve balance; in this case, the torques of the motor and the engine completely acts on the rotating shaft X2/the first input shaft. If an even gear position is engaged at the same time, then the torque of the rotating shaft X4/the second input shaft is zero, and the even gear position can be easily disengaged. If no even gear position is engaged, the torque applied to the first clutch is zero, and the first clutch can be released steadily. After the even gear position is disengaged or the first clutch is released, the motor and the engine can differentially drive the rotating shaft X2.

Under the situation that an even gear position is engaged, if the product of the torque Tm and the distance from the point X1 to the point X4 is equal to the product of the torque Ten and the distance from the point X3 to the point X4, but the torques are in opposite directions, then the torques of the motor and the engine relative to rotating shaft X4 achieve balance; in this case, the torques of the motor and the engine completely acts on the rotating shaft X4/the second input shaft. If an odd gear position is engaged at the same time, then the torque of the rotating shaft X2/the first input shaft is zero, and the odd gear position can be easily disengaged. If no odd gear position is engaged, the torque applied to the first clutch is zero, and the first clutch can be released steadily. After the odd gear position is disengaged or the first clutch is released, the motor and the engine can differentially drive the rotating shaft X4.

The speed ratio and the expression method of the dual input shaft speed change mechanism in the present invention are described in detail below.

The dual input shaft speed change mechanism 20 includes multiple pairs of forward gear positions and one reverse gear position, wherein the driving gears of the odd gear positions 1, 3, 5, . . . are disposed on the first input shaft 11, and the speed ratios are respectively $\eta_1, \eta_3, \eta_5, \ldots$; the driving gears of the even gear positions 2, 4, are disposed on the second input shaft 12, and the speed ratios are respectively $\eta_2, \eta_4, \ldots$; the driven gears corresponding to the gear positions are arranged on the output shaft 15, and are connected to the output shaft 15 by means of respective synchronizers Si.

Figure 10:
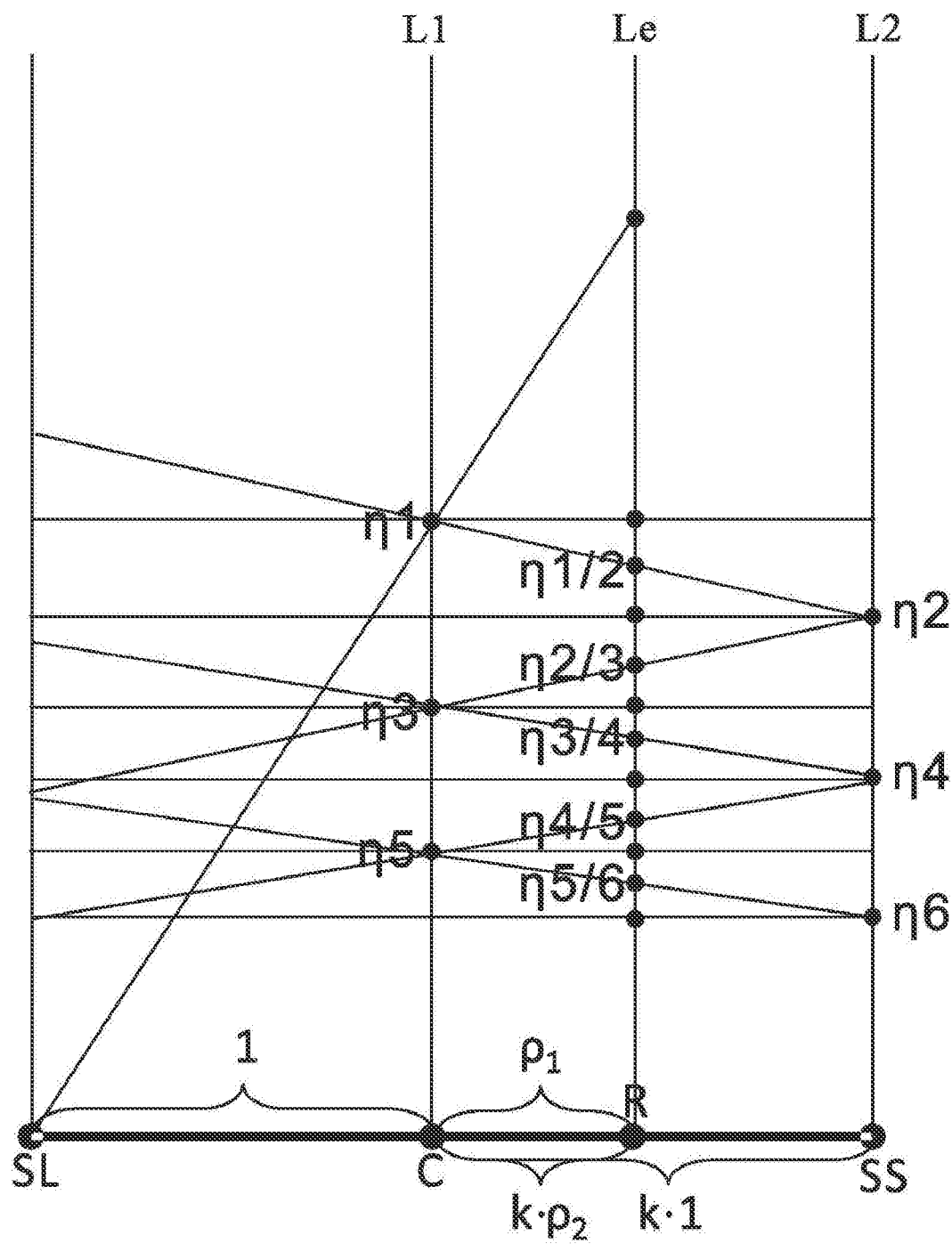
FIG. 10 is a speed ratio lever representation view of a power output shaft of an engine in the power drive system for a hybrid power vehicle according to the present invention.

As shown in FIG. 10, the first input shaft 11 is denoted with a perpendicular line L1, and the speed ratios $\eta_1, \eta_3, \eta_5$, of the odd gear positions 1, 3, 5, . . . on the first input shaft are denoted with ordinates; the second input shaft 12 is denoted with a perpendicular line L2, and the speed ratios $\eta_2, \eta_4$, of the even gear positions 2, 4, . . . on the second input shaft are denoted with ordinates; The power output shaft 2 of the engine 1 is denoted with a perpendicular line Le, and the speed ratio between the power output shaft 2 of the engine and the output shaft 15 of the dual input shaft speed change mechanism is denoted with an ordinate.

The speed ratio is defined as the ratio of the rotational speed of the input shaft to the rotational speed of the output shaft, namely the quotient obtained by dividing the rotational speed of the input shaft by the rotational speed of the output shaft. The speed ratio of the rotating shaft can be obtained by dividing the rotational speed of each rotating shaft of the planetary gear train by the rotational speed of the output shaft. Therefore, after the two sides of the kinematic constraint equations (1) and (2) between the rotating shafts of the composite planetary gear train are both replaced with the speed ratio of each shaft, the constraint equations are still valid; and the lever view representation under the kinematic constraints is also still valid, wherein the vectors respectively represent the speed ratios of the relevant shafts.

In the system of the present invention, the large sun gear of the planetary gear train is connected to the motor; the planet carrier C is connected to the first input shaft 11; the power output shaft 2 of the engine is connected to the gear ring; and the small sun gear SS is connected to the second input shaft 12. Therefore, the lever representation view representing the speed ratio relationship of each shaft can be combined with the speed ratio graphic method of the double-input-shaft gearbox, as shown in FIG. 10.

The present invention realizes the inherent gear positions with the following operation method:

If the synchronizer only engages an odd gear position i, then the speed ratio of the first input shaft 11 is $\eta i$. In this case, if the first clutch is engaged, then the four rotating shafts of the composite planetary gear mechanism are locked and rotate at the same speed, and the speed ratio between the planet carrier C and the engine shaft 2 is also equal to $\eta i$. The situation can be described as follows: a horizontal line is drawn from the point $\eta i$ on the straight line L1; the horizontal line intersects with the perpendicular line Le; and the ordinate of the intersection point represents the speed ratio $\eta i$ of the engine.

If the synchronizer only engages an even gear position j, then the speed ratio of the second input shaft 12 is $\eta j$. In this case, if the first clutch is engaged, then the four rotating shafts of the composite planetary gear mechanism are locked and rotate at the same speed, and the speed ratio between the planet carrier C and the engine shaft 2 is also equal to $\eta j$. The situation can also be described as follows: a horizontal line is drawn from the point $\eta j$ on the straight line L2; the horizontal line intersects with the perpendicular line Le; and the ordinate of the intersection point represents the speed ratio qj of the engine.

In summary, when the synchronizer only engages one gear position and the first clutch is engaged, the speed ratio of the power output shaft of the engine is equal to the speed ratio of the gear position; by engaging the synchronizer in different gear positions, the engine can realize each gear position; the gear positions, whose speed ratios $\eta 1$, $\eta 2$, $\eta 3$, . . . are determined by the speed ratios of the gears, are referred to as inherent gear positions. In FIG. 10, the speed ratios of the inherent gear positions are represented by the ordinates of the intersection points between the horizontal lines and the perpendicular line Le.

The present invention realizes the derivative gear positions with the following operation method:

The present invention not only has inherent gear positions, but also has a plurality of derivative gear positions: when the first clutch 4 is disengaged and the synchronizer engages an odd gear position i and an even gear position j, the speed ratio between the first input shaft 11 and the planet carrier C is $\eta i$, and the speed ratio between the second input shaft 12 and the small sun pinion SS is $\eta j$. With reference to FIG. 10, a straight line (an oblique line) passing the point $\eta i$ on L1 and the point $\eta j$ on L2 is made; the straight line intersects with Le at a point $\eta i/j$; the ordinate of the intersection point is the speed ratio of the power output shaft of the engine. It can be seen from FIG. 9 that the speed ratio between the gear ring R and the power output shaft 2 of the engine is between $\eta i$ and $\eta j$, and is a new speed ratio; the speed ratio is not equal to the speed ratio of any pair of gears, and is not inherent to a transmission gear pair; the speed ratio is generated by means of system structure design, is called a derivative speed ratio or a derivative gear position, and is expressed by i/j; the speed ratio is a speed ratio between the engaged odd gear position and the even gear position, is determined on the basis of the parameter of the planetary gear train, and is expressed by $\eta i/j$.

One derivative gear position can be generated between each pair of adjacent odd and even gear positions; n pairs of gears for the forward gear positions correspond to n inherent gear positions, and generate totally n−1 derivative gear positions. In addition, when the synchronizer engages a first gear, the motor drives a shaft A at a speed close to zero; in which case, the speed ratio of the engine is approximately $\eta 0/1 = (1+\rho)\eta 1$ which is greater than the speed ratio of the first gear. Therefore, the system totally has 2n gear positions: 0/1, 1, 1/2, 2, 2/3, 3, . . . , (n−1)/n, and n.

Odd gear positions and even gear positions which are not adjacent can also form derivative gear positions. However, the speed ratios thereof are generally inconvenient to use (shift), and are only used for gear skipping.

The power drive system for a hybrid power vehicle of the present invention can realize the following various gearshifts under the control of a vehicle control unit:

(1) an odd gear position i is shifted to an adjacent derivative gear position i/i+1 (upshift) or an adjacent derivative gear position i/i−1 (downshift); (2) an even gear position j is shifted to a derivative gear position j/j+1 (upshift) or a derivative gear position j/j−1 (downshift); (3) a derivative gear position i/i+1 is shifted to an even gear position i+1 (upshift) or an odd gear position i (downshift); and (4) a derivative gear position j/j+1 is shifted to an odd gear position j+1 (upshift) or an even gear position j (downshift). In summary, the system can perform gearshift from any gear position to an adjacent gear position, can upshift, and can also downshift.

(1a) an odd gear position i is shifted to a derivative gear position i/i+1:

System state before the gearshift: the odd gear position i is engaged, the first clutch is engaged, the composite planetary gear mechanism 5 is locked, and the engine and the motor parallelly drive the first input shaft 11.

The gearshift steps are as follows:

Step 1, adjusting the torques of the engine and the motor to achieve balance with the torque of the first input shaft;

Step 2, disengaging the first clutch, and enabling the motor and the engine to differentially drive the first input shaft;

Step 3, regulating the speed of the motor to synchronize the second input shaft with the gear position i+1;

Step 4, engaging the synchronizer in the even gear position i+1; and

Step 5, adjusting the torques of the engine and the motor as required. After the gearshift, the system engages the derivative gear position i/i+1, and the speed ratio of the engine is between the speed ratio for the gear position i and the speed ratio for the gear position i+1.

(1b) an odd gear position i is shifted to a derivative gear position i/i−1:

System state before the gearshift: the odd gear position i is engaged, the first clutch is engaged, the composite planetary gear mechanism 5 is locked, and the engine and the motor are connected in parallel to drive the first input shaft.

The gearshift steps are as follows:

Step 1, adjusting the torques of the engine and the motor to achieve balance with the torque of the first input shaft;

Step 2, disengaging the first clutch, and enabling the motor and the engine to differentially drive the first input shaft;

Step 3, regulating the speed of the motor to synchronize the second input shaft with the gear position i−1;

Step 4, engaging the synchronizer in the even gear position i−1; and

Step 5, adjusting the torques of the engine and the motor as required. After the gearshift, the system engages the derivative gear position i/i−1, and the speed ratio of the engine is between the speed ratio for the gear position i and the speed ratio for the gear position i−1.

(2a) a derivative gear position i/i+1 is shifted to an even gear position i+1:

System state before the gearshift: the odd gear position i and the even gear position i+1 are engaged, the first clutch is disengaged, and the engine and the motor drive the first input shaft and the second input shaft.

The gearshift steps are as follows:

Step 1, adjusting the torques of the engine and the motor to achieve balance with the torque of the second input shaft, and adjusting the torque of the first input shaft to be zero;

Step 2, disengaging the odd gear position i;

Step 3, regulating the speed of the motor to synchronize the rotational speed of the motor and the rotational speed of the engine with the rotational speed of the second input shaft;

Step 4, engaging the first clutch, locking the composite planetary gear mechanism, and rotating the four rotating shafts at the same speed; and Step 5, adjusting the torques of the engine and the motor as required, so as to complete the gearshift of the even gear position i+1.

(2b) a derivative gear position i/i+1 is shifted to an odd gear position i:

System state before the gearshift: the odd gear position i and the even gear position i+1 are engaged, the first clutch is disengaged, and the engine and the motor drive the first input shaft and the second input shaft.

The gearshift steps are as follows:

Step 1, adjusting the torques of the engine and the motor to achieve balance with the torque of the first input shaft, and adjusting the torque of the second input shaft to be zero;

Step 2, disengaging the even gear position j;

Step 3, regulating the speed of the motor to synchronize the rotational speed of the motor and the rotational speed of the engine with the rotational speed of the first input shaft;

Step 4, engaging the first clutch, locking the composite planetary gear mechanism, and rotating the four rotating shafts at the same speed; and Step 5, adjusting the torques of the engine and the motor as required, so as to complete the gearshift of the odd gear position i.

(3a) an even gear position j is shifted to a derivative gear position j/j+1:

System state before the gearshift: the even gear position j is engaged, the first clutch is engaged, the composite planetary gear mechanism is locked, and the engine and the motor are connected in parallel to drive the second input shaft.

The gearshift steps are as follows:

Step 1, adjusting the torques of the engine and the motor to achieve balance with the torque of the second input shaft;

Step 2, disengaging the first clutch, and enabling the motor and the engine to differentially drive the second input shaft;

Step 3, regulating the speed of the motor to synchronize the first input shaft with the odd gear position j+1;

Step 4, engaging the synchronizer in the gear position j+1; and

Step 5, adjusting the torques of the engine and the motor as required. The system completes the gearshift of the derivative gear position j/j+1, and the speed ratio of the engine is between the speed ratio for the gear position j and the speed ratio for the gear position j+1.

(3b) an even gear position j is shifted to a derivative gear position j/j−1:

System state before the gearshift: the even gear position j is engaged, the first clutch is engaged, the composite planetary gear mechanism is locked, and the engine and the motor are connected in parallel to drive the second input shaft.

The gearshift steps are as follows:

Step 1, adjusting the torques of the engine and the motor to achieve balance with the torque of the second input shaft;

Step 2, disengaging the first clutch, and enabling the motor and the engine to differentially drive the second input shaft;

Step 3, regulating the speed of the motor to synchronize the first input shaft with the odd gear position j−1;

Step 4, engaging the synchronizer in the gear position j−1; and

Step 5, adjusting the torques of the engine and the motor as required. The system completes the gearshift of the derivative gear position j/j−1, and the speed ratio of the engine is between the speed ratio for the gear position j and the speed ratio for the gear position j−1.

(4a) a derivative gear position j/j+1 is shifted to an odd gear position j+1:

System state before the gearshift: the even gear position j and the odd gear position j+1 are engaged, the first clutch is disengaged, and the engine and the motor drive the first input shaft and the second input shaft.

The gearshift steps are as follows:

Step 1, adjusting the torques of the engine and the motor to achieve balance with the torque of the first input shaft, and adjusting the torque of the second input shaft to be zero;

Step 2, disengaging the even gear position j;

Step 3, regulating the speed of the motor to synchronize the rotational speed of the motor and the rotational speed of the engine with the rotational speed of the first input shaft;

Step 4, engaging the first clutch, locking the composite planetary gear mechanism, and rotating the four rotating shafts at the same speed; and Step 5, adjusting the torques of the engine and the motor as required, so as to complete the gearshift of the odd gear position j+1.

(4b) a derivative gear position j/j+1 is shifted to an even gear position j:

System state before the gearshift: the even gear position j and the odd gear position j+1 are engaged, the first clutch is disengaged, and the engine and the motor drive the first input shaft and the second input shaft.

The gearshift steps are as follows:

Step 1, adjusting the torques of the engine and the motor to achieve balance with the torque of the second input shaft, and adjusting the torque of the first input shaft to be zero;

Step 2, disengaging the odd gear position j+1;

Step 3, regulating the speed of the motor to synchronize the rotational speed of the motor and the rotational speed of the engine with the rotational speed of the second input shaft;

Step 4, engaging the first clutch, locking the composite planetary gear mechanism, and rotating the four rotating shafts at the same speed; and Step 5, adjusting the torques of the engine and the motor as required, so as to complete the gearshift of the even gear position j.

The electric power driving mode of the present invention: when the vehicle is in the electric power driving mode, the engine is closed, the first clutch is disengaged, the brake is locked, and the gearbox engages an odd gear position; the motor outputs a forward torque to drive the rotating shaft of the large sun gear SL to rotate in a forward direction, so as to improve the speed; the brake locks the rotating shaft of the gear ring R; and the speed of the rotating shaft of the gear ring R/the power output shaft 2 of the engine is zero. It can be seen from the lever view that the rotating shaft of planet carrier C rotates in a forward direction, drives the first input shaft to rotate, and drives the wheel by means of the engaging gear. In the electric power driving mode, the system can engage any one odd gear position.

The hybrid driving mode of the present invention: when the vehicle is in the hybrid driving mode, the brake is disengaged; the engine and the motor operate; the gearbox engages an odd gear position, an even gear position or a derivative gear position; and the gear can be shifted.

In the present invention, the synchronizer can be replaced with other connectors. Examples of other suitable connectors include but not limited to: a frictional clutch and a full tooth clutch.

The present invention further sets forth a vehicle including the power drive system.

The descriptions above are only preferred embodiments of the present invention, but are not intended to limit the present invention. And any equivalent variations and modifications made within the scope of the present patent application for invention without departing from the spirit and scope of the present invention should all fall within the patent protection scope of the present invention.

What is claimed is:

1. A power drive system for a hybrid power vehicle, comprising an engine, a hybrid power module, and a dual input shaft speed change mechanism, wherein the hybrid power module consists of a motor, a composite planetary gear mechanism, a first clutch, and a torque transmitting device; the composite planetary gear mechanism is provided with at least four rotating shafts which are respectively connected to a rotor of the motor, a power output shaft of the engine, and a first input shaft and a second input shaft of the dual input shaft speed change mechanism; a rotational speed of the power output shaft of the engine is between a rotational speed of the first input shaft and a rotational speed of the second input shaft, and the rotational speed of the first input shaft is between a rotational speed of the motor and a rotational speed of the engine; the torque transmitting device is disposed on the power output shaft of the engine; the first clutch is disposed between any two of the four rotating shafts of the composite planetary gear mechanism; the dual input shaft speed change mechanism consists of the first input shaft, the second input shaft, multiple pairs of gears for forward gear positions, at least one set of gears for a reverse gear position, and at least one output shaft; driving gears of odd gear positions are disposed on the first input shaft; driving gears of even gear positions are disposed on the second input shaft; driven gears of respective gear positions are arranged on the output shaft; the driving gear of each gear position is meshed with the corresponding driven gear thereof; and in each gear position, there is one gear connected to a shaft at which the gear is located by means of a synchronizer or another connector;

wherein the composite planetary gear mechanism is a Ravigneaux planetary gear mechanism, and is provided with four coaxially rotating components: a large sun gear SL, a planet carrier C, a gear ring R, and a small sun gear SS; a rotating shaft of the gear ring R is connected to the power output shaft of the engine, such that the power of the engine can act on the planetary gear mechanism by means of the gear ring R; a rotating shaft of the large sun gear SL is connected to the rotor of the motor; a rotating shaft of the planet carrier C is connected to the first input shaft of the dual input shaft speed change mechanism; and a rotating shaft of the small sun gear SS is connected to the second input shaft of the dual input shaft speed change mechanism.

2. The power drive system for a hybrid power vehicle according to claim 1, wherein the torque transmitting device is a brake.

3. The power drive system for a hybrid power vehicle according to claim 1, wherein when the synchronizer or another connector only engages one gear position and the first clutch is engaged, the power output shaft of the engine outputs the gear position; and by engaging the synchronizer or another connector in different gear positions, the power output shaft of the engine can realize an inherent gear position of each gear.

4. The power drive system for a hybrid power vehicle according to claim 1, wherein when the first clutch is disengaged and the synchronizer or another connector engages in an odd gear position and an even gear position, the power output shaft of the engine outputs a derivative gear position between the odd gear position and the even gear position; and one derivative gear position is generated between each pair of adjacent odd and even gear positions.

5. A gearshift control method of the power drive system for a hybrid power vehicle according to claim 1, realized under the control of a vehicle control unit, and comprising the following steps:
gearshift has the following four situations: (1) a currently engaged odd gear position i is shifted to an adjacent derivative gear position i/i+1 or i/i−1; (2) a currently engaged derivative gear position i/i+1 or i/i−1 is shifted to an adjacent odd gear position i or an even gear position i+1; (3) a currently engaged even gear position j is shifted to an adjacent derivative gear position j/j+1 or j/j−1; and (4) a currently engaged derivative gear position j/j+ or j/j− is shifted to an adjacent odd gear position j+1 or j−1;
(1) an odd gear position i is shifted to a derivative gear position i/i+1 or i/i−1:
system state before the gearshift: the odd gear position i is engaged, the first clutch is engaged, the composite planetary gear mechanism is locked, and the engine and the motor parallelly drive the first input shaft 11; the gearshift steps are as follows:
step 1, adjusting the torques of the engine and the motor to achieve balance with the torque of the first input shaft;
step 2, disengaging the first clutch;
step 3, regulating the speed of the motor to synchronize the second input shaft with a gear in the gear position i+1 or the gear position i−1;
step 4, engaging the synchronizer or another connector in the even gear position i+1 or the even gear position i−1; and
step 5, adjusting the torques of the engine and the motor as required; after the gearshift, the system engages the derivative gear position i/i+1 or i/i−1, and the speed ratio of the engine is between the speed ratio for the gear position i and the speed ratio for the gear position i+1 or between the speed ratio for the gear position i and the speed ratio for the gear position i−1;
(2a) a derivative gear position i/i+1 is shifted to an even gear position i+1:
system state before the gearshift: the odd gear position i and the even gear position i+1 are engaged, the first clutch is disengaged, and the engine and the motor respectively drive the first input shaft and the second input shaft; the gearshift steps are as follows:
step 1, adjusting the torques of the engine and the motor to achieve balance with the torque of the second input shaft, and adjusting the torque of the first input shaft to be zero;
step 2, disengaging the odd gear position i;
step 3, regulating the speed of the motor to synchronize the rotational speed of the motor and the rotational speed of the engine with the rotational speed of the second input shaft;
step 4, engaging the first clutch, locking the composite planetary gear mechanism, and rotating the four rotating shafts at the same speed; and
step 5, adjusting the torques of the engine and the motor as required, so as to complete the gearshift of the even gear position i+1;
(2b) a derivative gear position i/i+1 is shifted to an odd gear position i:
system state before the gearshift: the odd gear position i and the even gear position i+1 are engaged, the first clutch is disengaged, and the engine and the motor respectively drive the first input shaft and the second input shaft; the gearshift steps are as follows:
step 1, adjusting the torques of the engine and the motor to achieve balance with the torque of the first input shaft, and adjusting the torque of the second input shaft to be zero;
step 2, disengaging the even gear position j;
step 3, regulating the speed of the motor to synchronize the rotational speed of the motor and the rotational speed of the engine with the rotational speed of the first input shaft;
step 4, engaging the first clutch, locking the composite planetary gear mechanism, and rotating the four rotating shafts at the same speed; and
step 5, adjusting the torques of the engine and the motor as required, so as to complete the gearshift of the odd gear position i;
(3) an even gear position j is shifted to a derivative gear position j/j+1 or j/j−1:
system state before the gearshift: the even gear position j is engaged, the first clutch is engaged, the composite planetary gear mechanism is locked, and the engine and the motor parallelly drive the second input shaft; the gearshift steps are as follows:
step 1, adjusting the torques of the engine and the motor to achieve balance with the torque of the second input shaft;
step 2, disengaging the first clutch, and enabling the composite planetary gear mechanism to differentially rotate;
step 3, regulating the speed of the motor to synchronize the first input shaft with the gear in the odd gear position j+1 or the odd gear position j−1;
step 4, engaging the synchronizer or another connector in the gear position j+1 or the gear position j−1; and
step 5, adjusting the torques of the engine and the motor as required; the system completes the gearshift of the derivative gear position j/j+1 or j/j−1, and the speed ratio of the engine is between the speed ratio for the gear position j and the speed ratio for the gear position j+1 or between the speed ratio for the gear position j and the speed ratio for the gear position j−1;
(4a) a derivative gear position j/j+1 is shifted to an odd gear position j+1:
system state before the gearshift: the even gear position j and the odd gear position j+1 are engaged, the first clutch is disengaged, and the engine and the motor respectively drive the first input shaft and the second input shaft; the gearshift steps are as follows:
step 1, adjusting the torques of the engine and the motor to achieve balance with the torque of the first input shaft, and adjusting the torque of the second input shaft to be zero;
step 2, disengaging the even gear position j;
step 3, regulating the speed of the motor to synchronize the rotational speed of the motor and the rotational speed of the engine with the rotational speed of the first input shaft;
step 4, engaging the first clutch, locking the composite planetary gear mechanism, and rotating the four rotating shafts at the same speed; and
step 5, adjusting the torques of the engine and the motor as required, so as to complete the gearshift of the odd gear position j+1;

(4b) a derivative gear position j/j−1 is shifted to an odd gear position j−1:

system state before the gearshift: the even gear position j and the odd gear position j+1 are engaged, the first clutch is disengaged, and the engine and the motor respectively drive the first input shaft and the second input shaft; the gearshift steps are as follows:

step 1, adjusting the torques of the engine and the motor to achieve balance with the torque of the second input shaft, and adjusting the torque of the first input shaft to be zero;

step 2, disengaging the odd gear position j+1;

step 3, regulating the speed of the motor to synchronize the rotational speed of the motor and the rotational speed of the engine with the rotational speed of the second input shaft;

step 4, engaging the first clutch, locking the composite planetary gear mechanism, and rotating the four rotating shafts at the same speed; and step 5, adjusting the torques of the engine and the motor as required, so as to complete the gearshift of the odd gear position j−1.

6. A vehicle, comprising the power drive system according to claim 1.

7. The power drive system for a hybrid power vehicle according to claim 1, wherein the torque transmitting device is a second clutch.

\* \* \* \* \*